United States Patent
Kang

(10) Patent No.: US 9,031,174 B1
(45) Date of Patent: May 12, 2015

(54) DEMAPPING DEVICE AND METHOD

(71) Applicant: FCI, Inc., Sungnam, Gyeonggi-Do (KR)

(72) Inventor: Byung Su Kang, Sungnam (KR)

(73) Assignee: FCI, Inc., Sungnam, Gyeonggi-Do (KR)

( * ) Notice: Subject to any disclaimer, the term of this patent is extended or adjusted under 35 U.S.C. 154(b) by 0 days.

(21) Appl. No.: 14/098,045

(22) Filed: Dec. 5, 2013

(51) Int. Cl.
*H04L 27/06* (2006.01)
*H04L 1/00* (2006.01)

(52) U.S. Cl.
CPC ............ *H04L 1/0048* (2013.01); *H04L 1/0071* (2013.01)

(58) Field of Classification Search
CPC ... H04L 1/0048; H04L 1/0071; H04L 25/067; H04L 27/2647; H04L 27/0008
USPC .................. 375/243, 261, 316, 322, 324, 340
See application file for complete search history.

(56) References Cited

U.S. PATENT DOCUMENTS

| | | | |
|---|---|---|---|
| 7,295,144 B1 * | 11/2007 | Karthik et al. | 341/200 |
| 2002/0031275 A1 * | 3/2002 | Cho et al. | 382/240 |
| 2004/0257253 A1 * | 12/2004 | Jones et al. | 341/143 |
| 2005/0002472 A1 * | 1/2005 | Lee et al. | 375/316 |

* cited by examiner

Primary Examiner — Syed Haider
(74) Attorney, Agent, or Firm — Lowe Hauptman & Ham, LLP

(57) ABSTRACT

The present invention provides a demapping device and method. The device includes: an averager receiving a compensation data for determining a degree of the compensation; a demapping function module receiving the compensation data for demapping the compensation data and then outputting a demapped compensation data; a quantizer coupled to the averager and the demapping function module, utilized to quantize the demapped compensation data according to the degree of the compensation and a maximum of quantization; a counter coupled to the quantizer for receiving a quantized data outputted from the quantizer, utilized to count a maximum value and a minimum value within the quantized data and output a counting result, and to simultaneously provide the maximum of quantization for the quantizer; and a compressor coupled to the counter, utilized to compress the counting result to reduce a number of bits.

4 Claims, 1 Drawing Sheet

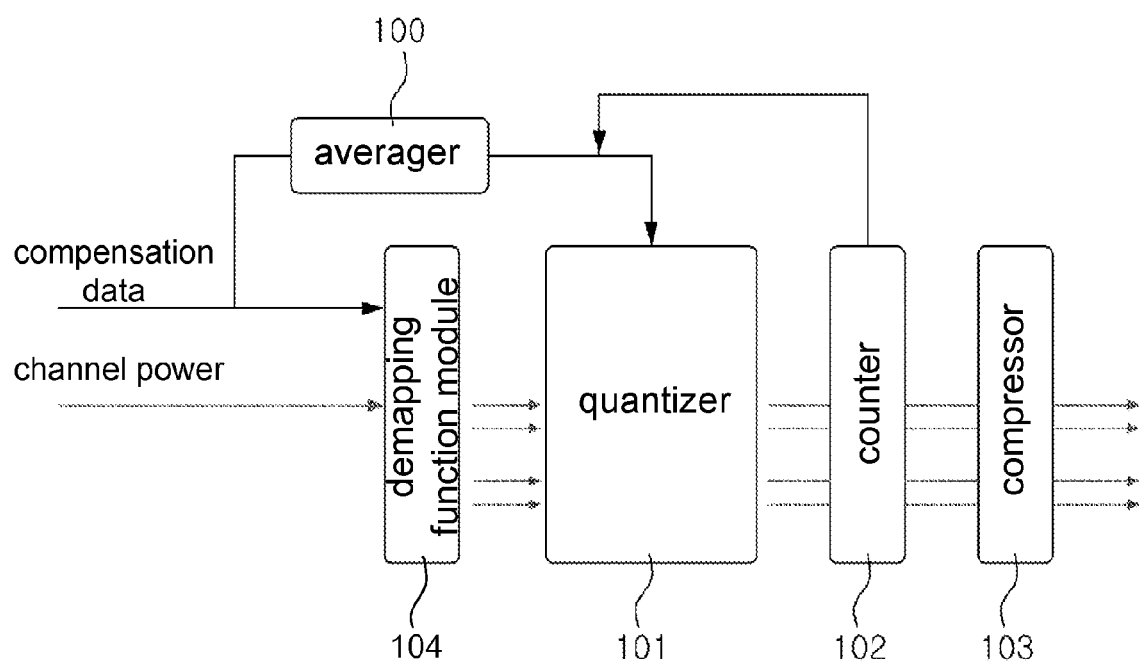

DEMAPPING DEVICE AND METHOD

TECHNICAL FIELD OF THE INVENTION

The present invention relates to a demapping device and method, and more particularly to a demapping device and method for automatically determining an optimum output according to channel conditions and input data.

BACKGROUND OF THE INVENTION

Typically, a demapper plays the following roles: after a channel compensation is executed for a received data, the demapper generates an input of a channel decoder with an appropriate size about a number of bits of a soft decision based on modulation after various demapping processes.

After the demapping herein, the reason why the output of the demapper is set as the rather than a hard decision is that the soft decision input which is applied to the channel decoder has a performance gain 2.2 dB theoretically in an Additive White Gaussian Noise (AWGN) channel with respect to the hard decision input.

However, in any case increasing the number of bits of the soft decision in the demapper, the gain will not continue getting bigger. The outputted number of bits of the demapper is determined by a memory size of the deinterleaver behind the demapper in a typical communication system. Therefore, the design for the demapper focuses on the following aspects: to minimize performance degradation and to less dispatch the number of output bits.

In order to achieve foregoing objectives, the conventional demapper has the following configuration: computing an appropriate location of the channel-compensated data in advance, thereby outputting in accordance with a degree of the number of bits of the soft decision from the corresponding location. The channel-compensated data is utilized as the input of the demapper according to a reference gain value of an automatic gain adjusting device in front of the demapper This is a method of determining an average level of the channel-compensated data by using the reference gain value of the automatic gain adjusting device. In the case that channel conditions are at a normal level, a good performance can be expected.

However, in the case that the channel conditions change to an unexpected state, or interfering signals such as an interchannel interference or a co-channel interference and so on exist, an input level of the demapper may substantially change. Therefore, if the method of only using a reference level of the automatic gain adjusting device to determine the output of demapper at a predetermined position is utilized in this case, an abnormal output of the demapper is outputted.

For example, when the input of the demapper is larger than normality, the majority of the output of the demapper is dispatched in a maximum output. Conversely, when the input of the demapper is smaller than the normality, the majority of the output of the demapper is transmitted in zero. In this case, the performance degradation of a whole receiver is unavoidable.

In order to reduce the performance degradation in the aforesaid case, the number of output bits of the demapper should be further enlarged to a sufficient number of bits for ensuring a response to the unexpected channel conditions. However, as mentioned above, because the deinterleaver is positioned behind the demapper in the typical communication system, the memory of the deinterleaver will get bigger based on the degree. Thus, it is not a good solution.

SUMMARY OF THE INVENTION

Technical Problem

Accordingly, the present invention has been developed in order to solve the above drawbacks. An objective of the present invention is to provide a demapping device and method for reducing the memory size of the deinterleaver, reducing the number of output bits of the demapper, and automatically determining an optimum output according to channel conditions and the input data with a minimized performance degradation.

Technical Solution

To achieve the foregoing objective, a demapping device provided in the present invention includes: an averager receiving a compensation data for determining a degree of the compensation; a demapping function module receiving the compensation data for demapping the compensation data and then outputting a demapped compensation data; a quantizer coupled to the averager and the demapping function module, utilized to quantize the demapped compensation data according to the degree of the compensation and a maximum of quantization; a counter coupled to the quantizer for receiving a quantized data outputted from the quantizer, utilized to count a maximum value and a minimum value within the quantized data and output a counting result, and to simultaneously provide the maximum of quantization for the quantizer; and a compressor coupled to the counter, utilized to compress the counting result to reduce a number of bits.

In one preferred embodiment, the counting result after the compression is inputted into a deinterleaver for decreasing a memory size of the deinterleaver.

To achieve the foregoing objective, a demapping method provided in the present invention includes the steps of: receiving a compensation data for determining a degree of the compensation; demapping the compensation data; quantizing the demapped compensation data according to the degree of the compensation and a maximum of quantization to obtain a quantized data; counting a maximum value and a minimum value within the quantized data to obtain the maximum of quantization and a counting result; and compressing the counting result to reduce a number of bits of the counting result.

In one preferred embodiment, the counting result with the reduced number of bits is utilized to decrease a memory size in a deinterleaver.

Advantageous Effects

The present invention as mentioned above provides following advantages. In a variety of channel conditions, an environment with the interfering signals such as the interchannel interference or the co-channel interference, the demapping device can automatically adapt for generating the optimum output, thereby applying to and being applicable in most of the communication systems.

In addition, the present invention is capable of minimizing the performance degradation and reducing the number of output bits of the demapping device to reduce the memory size of the deinterleaver. Alternatively, even with the same memory, the better performance also can be expected.

BRIEF DESCRIPTION OF THE DRAWINGS

FIG. 1 is a block diagram illustrating a whole demapping device of the present invention.

DETAILED DESCRIPTION OF THE INVENTION

Hereinafter, the present invention will be described in detail with reference to the accompanying drawings.

FIG. 1 is a block diagram illustrating a whole demapping device of the present invention.

Referring to FIG. 1, expect for the demapping function module 104 using in a common demapper, the demapping device further includes: an averager 100 which determines a degree of compensation of a received data; a quantizer 101 which quantizes a demapped result and outputs it; a counter 102 which counts a maximum value or a minimum value within the quantized output; and a compressor 103 which reduce the number of bits of the final output.

The averager 100 determines the degree of the channel-compensated data. In general, the degree of the channel-compensated data varies with a reference gain value of an automatic gain adjusting device in front of the demapping device. However, under the condition of changeful channel conditions or a plurality of interfering signals existing, the degree of the input (i.e. the channel-compensated data) of demapping device may be different.

In this case, the demapping device executes the actions of reasonably dispatching the output by automatically determining the degree of the input and informing the rearward quantizer after the degree of the input is computed.

The quantizer 101 plays the following roles: if a quantization level which is suitable for the current channel conditions is computed by using information computed according to the input and the output of the demapping device, separate regions are divided according to the number of the number of output bits by reference to a value of a quantization level, thereby determining the number of output bits which is generated due to the input.

The counter 102 is utilized to count numbers of a maximum value and a minimum value which are dispatched according to the output of the quantizer and then to configure the maximum value of the quantizer.

Even if an average value of an absolute value of the input (i.e. the channel-compensated data) of demapping device is identical, a situation that the output of the demapping device excessively tilts to the maximum value or the minimum value according to dispersing values. Therefore, the maximum value or the minimum value are respectively counted based on the output of the quantizer; thus, under the condition that a ratio of the two values is divorced from a predetermined appropriate ratio, the levels of the quantizer is readjusted to make them be output in a proper ratio.

The compressor 103 plays the following roles: to slightly lower the performance, and to reduce the number of output bits, thereby reducing the memory size inside the deinterleaver.

The number of all kinds of samples that is dispatched to utilized as the output of the quantizer is determined according to the number of output bits, by using output frequencies of all the samples being not the same.

Preferably, the compressor 103 executes the following actions: in the samples that is dispatched to utilized as the output of the quantizer 101, to divide the samples into the samples having a high proportion and the others, and then to replace the samples having a low proportion as the samples near the samples having the high proportion.

The number of output bits in the final can be changed depending on the number of the samples having the high proportion. The data of the samples which is changed into the samples have a higher priority can be represented in a less number of bits, so the following gains can be obtained: the number of output bits of the demapping device is reduced, and the memory size decreases according to the reduced number of output bits.

After the number of output bits is reduced by using this process, an action of recovering the number of bits based on the input of the channel decoder should be added. The data represented by the less number of bits is recovered to the output of the original demapping device with the higher priority according the input of the channel decoder.

If the recovered data according to the output of the demapping device and the input of the channel decoder is compared, all values with the higher priority are recovered as original values, and only the data with the low priority is replaced by the nearby data with the high priority. Thus, the performance degradation due to the reduced output bits can be minimized.

The following will explain the method of the demapping device of the present invention in detail.

First, the averager 100 receives the compensation data and determines the degree of the compensation to inform quantizer 101, an then the quantizer employs the degree of the compensation and a maximum of quantization to quantize the demapped compensation data and to output a quantization data.

Then, the counter 102 determines whether the output signal has the proper values once again and to return the result to the quantizer 101.

The quantizer 101 employs the information received from the counter 102 once again for adjusting the quantization level. The aforesaid processes are executed continuously during receiving signals; even if the channel changes, it can continue following the optimum output.

Accordingly, the compressor slightly lowers the performance through the signal outputted from the counter 102, and the number of output bits is reduced, thereby reducing the memory size inside the deinterleaver.

While this invention has been particularly shown and described with reference to preferred embodiments thereof, it will be understood by one skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A demapping device, comprising:
an averager receiving a compensation data for determining a degree of the compensation;
a demapping function module receiving the compensation data for demapping the compensation data and then outputting a demapped compensation data;
a quantizer coupled to the averager and the demapping function module, utilized to quantize the demapped compensation data according to the degree of the compensation and a maximum of quantization;
a counter coupled to the quantizer for receiving a quantized data outputted from the quantizer, utilized to count a maximum value and a minimum value within the quantized data under a condition that a ratio of the maximum value and the minimum value is divorced from a predetermined ratio and output a counting result, and to simultaneously provide the maximum of quantization for the quantizer to readjust levels of the quantizer; and a compressor coupled to the counter, utilized to compress the counting result to reduce a number of bits.

2. The demapping device of claim 1, wherein the counting result after the compression is inputted into a deinterleaver for decreasing a memory size of the deinterleaver.

3. A demapping method, comprising:

receiving a compensation data for determining a degree of the compensation by an averager;

demapping the compensation data by a demapping function module;

quantizing the demapped compensation data according to the degree of the compensation and a maximum of quantization to obtain a quantized data by a quantizer;

counting a maximum value and a minimum value within the quantized data under a condition that a ratio of the maximum value and the minimum value is divorced from a predetermined ratio to obtain the maximum of quantization to readjust levels of the quantizer and a counting result by a counter; and compressing the counting result to reduce a number of bits of the counting result by a compressor.

4. The method of claim 3, wherein the counting result with the reduced number of bits is utilized to decrease a memory size in a deinterleaver.

* * * * *